United States Patent
Shima

(10) Patent No.: US 10,227,670 B2
(45) Date of Patent: Mar. 12, 2019

(54) PISTON RING AND ITS PRODUCTION METHOD

(71) Applicant: KABUSHIKI KAISHA RIKEN, Tokyo (JP)

(72) Inventor: Yuji Shima, Kashiwazaki (JP)

(73) Assignee: KABUSHIKI KAISHA RIKEN, Tokyo (JP)

(*) Notice: Subject to any disclaimer, the term of this patent is extended or adjusted under 35 U.S.C. 154(b) by 179 days.

(21) Appl. No.: 15/113,631

(22) PCT Filed: Jan. 22, 2015

(86) PCT No.: PCT/JP2015/051614
§ 371 (c)(1),
(2) Date: Jul. 22, 2016

(87) PCT Pub. No.: WO2015/111642
PCT Pub. Date: Jul. 30, 2015

(65) Prior Publication Data
US 2017/0009314 A1   Jan. 12, 2017

(30) Foreign Application Priority Data
Jan. 23, 2014  (JP) ................ 2014-010493

(51) Int. Cl.
*C22C 38/18* (2006.01)
*C21D 9/40* (2006.01)
(Continued)

(52) U.S. Cl.
CPC .......... *C21D 9/40* (2013.01); *C21D 1/06* (2013.01); *C21D 1/18* (2013.01); *C21D 1/25* (2013.01);
(Continued)

(58) Field of Classification Search
CPC ... C21D 9/40; C21D 9/52; C21D 1/06; C21D 1/18; C21D 1/25; C21D 1/30; C21D 1/32;
(Continued)

(56) References Cited

U.S. PATENT DOCUMENTS 7,493,882 B2* 2/2009 Hiraishi .............. F16J 9/00
123/193.2
8,592,050 B2 11/2013 Ogawa et al.
(Continued)

FOREIGN PATENT DOCUMENTS

EP   3 006 787 A1    4/2016
JP   2000-282177 A   10/2000
(Continued)

OTHER PUBLICATIONS

Extended European Search Report dated Oct. 12, 2017, in European Patent Application No. 15739765.4.
(Continued)

*Primary Examiner* — Gilbert Y Lee
(74) *Attorney, Agent, or Firm* — Birch, Stewart, Kolasch & Birch, LLP

(57) ABSTRACT

To provide a piston ring of low-alloy steel having excellent nitridability, namely, a piston ring of low-alloy steel having excellent thermal conductivity and capable of being provided with a sufficient nitrided layer, steel comprising by mass 0.45-0.65% of C, 0.15-0.35% of Si, 0.65-1.00% of Mn and 0.60-1.10% of Cr as indispensable alloy elements, and less than 0.35% of Mo, less than 0.25% of V and less than 0.001% of B as optional alloy elements, the total amount of the indispensable alloy elements and the optional alloy elements being less than 3.0% by mass, is formed into a piston ring; and the nitrided layer is formed on its surface.

7 Claims, 1 Drawing Sheet

(51) Int. Cl.

| | |
|---|---|
| *C23C 8/26* | (2006.01) |
| *C23C 8/38* | (2006.01) |
| *C23C 8/50* | (2006.01) |
| *C21D 1/06* | (2006.01) |
| *C21D 1/32* | (2006.01) |
| *C22C 38/00* | (2006.01) |
| *C22C 38/32* | (2006.01) |
| *F16J 9/26* | (2006.01) |
| *C21D 1/18* | (2006.01) |
| *C21D 1/25* | (2006.01) |
| *C21D 1/58* | (2006.01) |
| *C21D 1/30* | (2006.01) |
| *C22C 38/02* | (2006.01) |
| *C22C 38/04* | (2006.01) |
| *C22C 38/22* | (2006.01) |
| *C22C 38/24* | (2006.01) |
| *C21D 9/52* | (2006.01) |

(52) U.S. Cl.
CPC ............... *C21D 1/30* (2013.01); *C21D 1/32* (2013.01); *C21D 1/58* (2013.01); *C22C 38/00* (2013.01); *C22C 38/02* (2013.01); *C22C 38/04* (2013.01); *C22C 38/22* (2013.01); *C22C 38/24* (2013.01); *C22C 38/32* (2013.01); *C23C 8/26* (2013.01); *C23C 8/38* (2013.01); *C23C 8/50* (2013.01); *F16J 9/26* (2013.01); *C21D 9/52* (2013.01); *C21D 2211/003* (2013.01); *C21D 2211/008* (2013.01)

(58) Field of Classification Search
CPC ........... C21D 1/58; C22C 38/00; C22C 38/02; C22C 38/04; C22C 38/22; C22C 38/24; C22C 38/32; C23C 8/26; C23C 8/38; C23C 8/50; F16J 9/00; F16J 9/26
See application file for complete search history.

(56) References Cited

U.S. PATENT DOCUMENTS

| | | | |
|---|---|---|---|
| 9,347,559 B2 | 5/2016 | Sekiya et al. | |
| 2008/0053396 A1 | 3/2008 | Hiraishi et al. | |
| 2009/0226756 A1* | 9/2009 | Ogawa | C22C 38/02 |
| | | | 428/684 |
| 2014/0125013 A1* | 5/2014 | Sekiya | C23C 14/0641 |
| | | | 277/442 |
| 2015/0101715 A1* | 4/2015 | Takeda | C21D 9/52 |
| | | | 148/580 |

FOREIGN PATENT DOCUMENTS

| | | |
|---|---|---|
| JP | 2002-317225 A | 10/2002 |
| JP | 3380748 B2 | 2/2003 |
| JP | 2005-61389 A | 3/2005 |
| JP | 2009-235561 A | 10/2009 |
| JP | 4954644 B2 | 6/2012 |
| JP | 2013-29191 A | 2/2013 |
| JP | 2013-76125 A | 4/2013 |
| JP | 2014-5532 A | 1/2014 |

OTHER PUBLICATIONS

International Search Report for PCT/JP2015/051614 (PCT/ISA/210) dated Apr. 21, 2015.
Written Opinion of the International Searching Authority for PCT/JP2015/051614 (PCT/ISA/237) dated Apr. 21, 2015.
European Patent Office Communication pursuant to Article 94(3) EPC issued in the corresponding European Patent Application No. 15739765.4 dated Sep. 11, 2018.
Zagonel et al., "Influence of the process temperature on the steel microstructure and hardening in pulsed plasma nitriding," Surface & Coatings Technology, vol. 201, 2006, pp. 452-457.

* cited by examiner

PISTON RING AND ITS PRODUCTION METHOD

FIELD OF THE INVENTION

The present invention relates to a piston ring for internal-combustion engines, particularly to a piston ring of low-alloy steel on which a nitrided layer is formed, and its production method.

BACKGROUND OF THE INVENTION

Because piston rings for automobile engines are required to have excellent slidability, piston rings made of steel such as silicon-chromium steel (SWOSC-V) and martensitic stainless steel [SUS440B (17% Cr), SUS420J2 (13% Cr), etc.] are usually surface-treated. Among surface treatments, economically advantageous nitriding is conveniently used for martensitic stainless steel, high-alloy steel. However, because silicon-chromium steel, low-alloy steel, is not sufficiently nitrided, ion plating of chromium nitride (CrN) and chromium plating are used.

Piston ring materials are also required to have not only the above slidability, but also heat resistance for keeping spring characteristics, thermal conductivity for cooling pistons, wear resistance for side surfaces, and good workability (hot- and cold-workability). From the aspects of thermal conductivity, workability and cost, heat resistance (heat sag resistance) is desirably improved by using low-alloy steel, to keep spring characteristics and have good wear resistance on side surfaces. Particularly with respect to the wear resistance of side surfaces, the formation of a desired nitrided layer on low-alloy steel would provide larger economic and environmental effects than those of other surface treatments.

To provide steel capable of being formed by cold rolling and nitriding into light-weight, low-cost piston rings having high performance, JP 2000-282177 A discloses steel comprising by weight 0.50-0.80% of C, 1.55-3.00% of Si, 0.20-1.50% of Mn, 0.60-2.00% of Cr, and 0.05-1.00% of V, the balance being Fe and inevitable impurities, the maximum thickness of oxide inclusions containing 80% or more of Al or Si being 30 μm or less in a rolling-direction cross section including a center portion of the steel. This material is obtained by adding V to the above-described silicon-chromium steel (SWOSC-V), with high upper limits of other elements. With respect to a nitrided layer, it discloses a surface layer having hardness of 903-1191 HV, and a hardened layer having depth (not defined) of 0.26-0.32 mm, though not disclosing nitriding conditions, etc.

To provide an inexpensive piston ring having excellent slidability without wearing ring grooves of an aluminum alloy piston, JP 2005-61389 A discloses a piston ring having a hard coating on an outer peripheral surface of a base material, and a chemical conversion coating on at least one of upper and lower side surfaces; the base material comprising by mass 0.50-0.70% of C, 1.65-2.50% of Si, 0.50-1.50% of Mn, 0.50-3.00% of Cr, and 0.05-0.50% of V, the balance being Fe and inevitable impurities; and the hard coating being formed by PVD or high-velocity oxy-fuel thermal spraying. It further discloses that when this base material is nitrided, it has surface hardness of less than 1000 HV0.1 and 700 HV0.1 or more, and that even after nitriding, a good chemical conversion coating is formed on its side surfaces. However, nitriding conditions and nitriding depth, etc. are not disclosed.

Though materials for the piston rings of JP 2000-282177 A and JP 2005-61389 A are categorized in low-alloy steel, the amount of alloy elements are slightly larger than those in so-called silicon-chromium steel, so that they are poorer than silicon-chromium steel in thermal conductivity. At present, there is no low-alloy steel for piston rings, which is better than silicon-chromium steel in thermal conductivity and the formability of a nitrided layer.

Object of the Invention

An object of the present invention is to provide a piston ring of low-alloy steel having excellent nitridability, namely, a piston ring of low-alloy steel having excellent thermal conductivity, on which a sufficient nitrided layer can be formed, and its production method.

Disclosure of the Invention

As a result of intensive research on the relations between the thickness of a nitrided layer having hardness of 700 HV0.05 or more, the amounts of alloy elements in a base material, the structure of the base material, etc. and the diffusion of nitrogen, in silicon-chromium steel, the inventor has found that by reducing the amount of Si among the alloy elements, and by having a structure in which C is dispersed as fine carbide, a piston ring of low-alloy steel, which has excellent thermal conductivity, and is provided with a nitrided layer sufficient for exhibiting wear resistance, can be obtained.

Thus, the piston ring of the present invention is made of steel comprising C, Si, Mn and Cr as indispensable alloy elements, and Mo, V and B as optional alloy elements; the indispensable alloy elements having a composition comprising by mass 0.45-0.65% of C, 0.15-0.35% of Si, 0.65-1.00% of Mn, and 0.60-1.10% of Cr; the optional alloy elements having a composition comprising by mass less than 0.35% of Mo, less than 0.25% of V, and less than 0.001% of B; the total amount of the indispensable alloy elements and the optional alloy elements being less than 3.0% by mass; and a nitrided layer being formed on the surface.

The outermost surface of the nitrided layer is preferably a diffusion layer exposed by removing a compound layer. The piston ring preferably has hardness HV0.05 of 700 HV0.05 or more, with a hardness reduction ratio of 3 HV0.05/μm or less in a depth direction, to the depth of 40 μm from the outermost surface.

A base material of the piston ring preferably has hardness, which is 90-100% of the hardness before nitriding.

The steel preferably contains C concentrated in prior austenite grain boundaries. Prior austenite grains in the steel have a grain size number of preferably 8 or more, further preferably 9 or more. The steel preferably has a structure in which spheroidal cementite is dispersed in a tempered martensite matrix.

The method of the present invention for producing a piston ring having a nitrided layer on the surface from a wire made of steel comprising C, Si, Mn and Cr as indispensable alloy elements, and Mo, V and B as optional alloy elements; the indispensable alloy elements having a composition comprising by mass 0.45-0.65% of C, 0.15-0.35% of Si, 0.65-1.00% of Mn, and 0.60-1.10% of Cr; the optional alloy elements having a composition comprising by mass less than 0.35% of Mo, less than 0.25% of V, and less than 0.001% of B; and the total amount of the indispensable alloy elements and the optional alloy elements being less than 3.0% by mass; comprises conducting oil tempering at a quenching temperature of 820-930° C. and a tempering temperature of 440-500° C. before forming the piston ring; and conducting a strain-removing heat treatment at a temperature of 420-480° C., lower than the tempering temperature, and nitriding at a temperature within ±30° C. from the tempering temperature, after forming the piston ring.

Annealing is preferably conducted before the oil tempering.

Effects of the Invention

Because the total amount of alloy elements in low-alloy steel is limited to less than 3.0% by mass, the piston ring of the present invention has good workability and excellent thermal conductivity, making it possible for heat from a piston head to efficiently escape to a cylinder wall. With Si decreased in a matrix, part of C turned to carbide, and C segregated from grains to boundaries (boundaries of prior austenite grains), nitrogen (N) has a high diffusion coefficient in grains, increasing the depth of a nitrogen diffusion layer having predetermined hardness, thereby providing the nitrided layer with excellent wear resistance. Because nitriding is conducted at a temperature not so higher than the tempering temperature of a wire for the piston ring, the hardness of a base material is not excessively reduced by nitriding, enabling the piston ring to have a sufficient spring constant. The nitrided layer of the present invention can be applied to the side surfaces of a piston ring to have enough wear resistance, resulting in large economic and environmental contribution.

DESCRIPTION OF THE PREFERRED EMBODIMENTS

Figure 1:
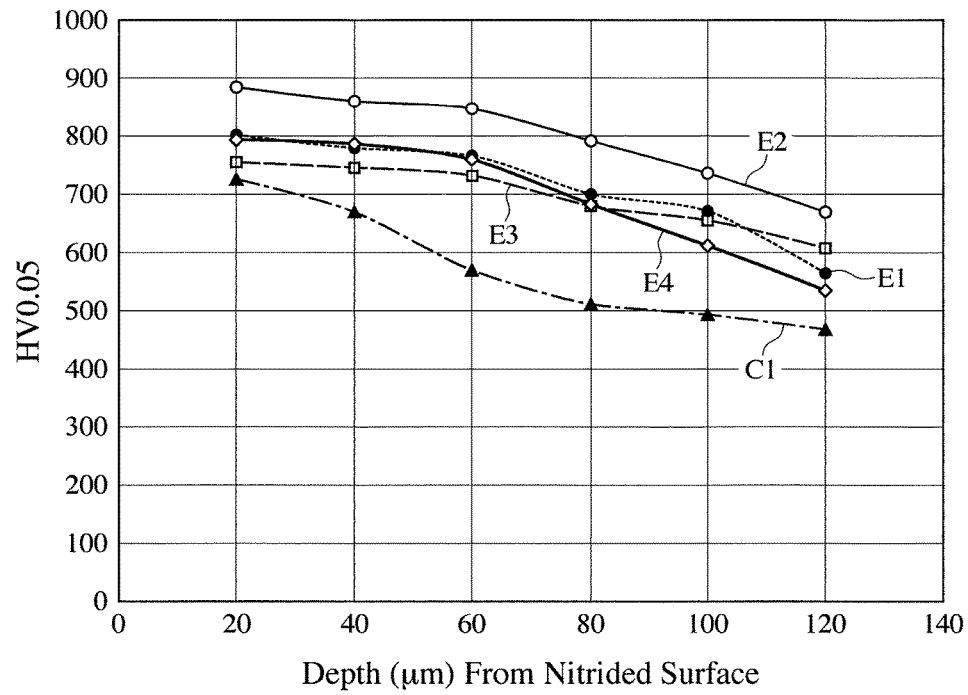
FIG. 1 is a graph showing the hardness (HV0.05) distributions of nitrided layers in a depth direction in Examples 1-4 and Comparative Example 1.

The piston ring of the present invention has been obtained by investigating the influence of alloy components on the nitridability of silicon-chromium steel. The alloy components of silicon-chromium steel are by mass 0.51-0.59% of C, 1.20-1.60% of Si, 0.50-0.80% of Mn, 0.025% or less of P, 0.025% or less of S, 0.50-0.80% of Cr, and 0.2% or less of Cu. Because nitrogen supplied to the diffusion layer by nitriding appears to partially form Cr nitride, the remainder being dissolved in the base material, the growing speed of the diffusion layer is determined by the precipitation of nitride and the diffusion of nitrogen. The inventor has found that the precipitation of alloy nitrides such as Cr nitride is important to increase the hardness of the nitrided layer, and that to increase the diffusion speed of nitrogen to form a deep diffusion layer, it is important to make the amounts of solutes such as C, Si, Mn, etc. in the base material as small as possible, thereby reducing interaction between diffused nitrogen and the solutes.

Accordingly, the piston ring of the present invention comprises C, Si, Mn and Cr as indispensable alloy elements, specifically 0.45-0.65% of C, 0.15-0.35% of Si, 0.65-1.00% of Mn, and 0.60-1.10% of Cr by mass. The amount of Si is reduced to about 1/10 to 1/3.5 in silicon-chromium steel, to increase the diffusion coefficient of nitrogen in the steel. Optional alloy elements added, if necessary, to increase the hardness of the nitrided layer are less than 0.35% by mass of Mo and/or less than 0.25% by mass of V, nitride-forming elements, and less than 0.001% by mass of B, a grain-boundary-strengthening element. However, to keep high thermal conductivity, the total amount of the indispensable alloy elements and the optional alloy elements is less than 3.0% by mass. Of course, decrease in the amount of Si contributes to increasing the thermal conductivity. Because the total amount of alloy elements in silicon-chromium steel has a median of 3.25%, the thermal conductivity in the present invention is higher than that of silicon-chromium steel. P and S are contained as inevitable impurities in the present invention, though not particularly described. P and S are usually 0.035% or less each.

The amount of C as a solute in the base material decreases when C is precipitated as carbide by a heat treatment, and the amount of C dissolved in the grains decreases when C is concentrated in grain boundaries (austenite grain boundaries). To precipitate C as carbide, annealing is preferable to form spheroidal cementite. The annealing is preferably conducted at a temperature of 600-720° C., equal to or lower than Ac1 in the Fe—C phase diagram, for 30-240 minutes. During the strain-removing heat treatment for avoiding deformation due to strain generated by forming the piston ring, C is concentrated in grain boundaries like B, increasing grain-boundary cohesive energy, thereby strengthening the grain boundaries. The strain-removing heat treatment is conducted preferably at a high temperature, unless the hardness of the base material largely decreases. Specifically, it is conducted preferably at 420-480° C. Absorbing N in a subsequent nitriding step, (C-fixing) carbide changes to carbonitride and then to nitride, so that C atoms are released, and concentrated and cohered in grain boundaries. Thus, the existence of C in grain boundaries is clearer after nitriding.

When the low-alloy steel of the present invention is nitrided, a compound layer is formed on the outermost surface. Because the compound layer is composed of an $Fe_{(2-4)}N$ phase, which has high hardness but comprises a porous oxide film, there is preferably no compound layer on a sliding surface. Accordingly, in the piston ring of the present invention, the compound layer is preferably removed to expose a diffusion layer on the outermost surface of the nitrided layer. In order that the nitrogen diffusion layer functions as a sliding surface having excellent wear resistance, the diffusion layer having Vickers hardness of 700 HV0.05 or more, preferably 700-900 HV0.05, is as thick as preferably 40 μm or more, more preferably 50 μm or more, further preferably 60 μm or more. The nitrided layer is preferably uniform in a depth direction. The hardness reduction ratio of the nitrided layer in a depth direction is preferably 3 HV0.05/μm or less, more preferably 2 HV0.05/μm or less, further preferably 1 or less, to the depth of 40 μm from the outermost surface. To have as small a hardness reduction ratio as possible in a depth direction, the diffusion coefficient of nitrogen in the grains should be high.

Because low-alloy steel is used in the present invention, nitriding should be carried out while avoiding the softening of the base material. In the piston ring of the present invention, the base material should have predetermined hardness (for example, of 400-500 HV1), admissible softening being such that the hardness of the base material is preferably 90-100%, more preferably 92-100%, further preferably 94-100%, of that before nitriding. To suppress the softening of the base material to the above degree, nitriding is conducted preferably at a temperature within ±30° C. from the tempering temperature.

The nitrided layer is formed in a sliding portion of the piston ring of the present invention. The nitrided layer is formed preferably on side surfaces of a top ring sliding in a ring groove of a piston, to reduce the wear of a ring groove of a piston. Of course, the nitrided layer may be formed as a primer layer, to form a chemical conversion coating or an adhesion-preventing coating thereon. Depending on applications, a hard coating such as CrN, TiN, DLC, etc. may be formed on an outer peripheral sliding surface on or without the nitrided layer.

A wire having a predetermined cross section for producing the piston ring of the present invention is obtained from steel produced by a melting method, which comprises by mass 0.45-0.65% of C, 0.15-0.35% of Si, 0.65-1.00% of Mn and 0.60-1.10% of Cr as indispensable alloy elements, and less than 0.35% of Mo, less than 0.25% of V and less than 0.001% of B as optional alloy elements; the total amount of the indispensable alloy elements and the optional alloy elements being less than 3.0% by mass; the steel being hot-rolled to a wire; and the wire being subjected to a series of steps including patenting, cleaning with acid, drawing, patenting, cleaning with acid, drawing, and oil tempering (oil quenching and tempering). To precipitate C as spheroidal cementite, one of the patenting steps is preferably replaced by the above spheroidization annealing. The patenting is a heat treatment for continuously causing isothermal transformation or cooling transformation to form a fine pearlite structure in a line heat treatment, which is carried out specifically at a temperature from 900° C. to 600° C. The oil tempering is a so-called oil quenching-tempering treatment, which should be carried out with such temperature and time as to avoid all carbide from dissolving to maintain precipitated spheroidal cementite. The quenching step is preferably conducted after heating at a temperature of 820-980° C. for several tens of seconds to several minutes (for example, 30 seconds to 3 minutes), and the tempering step is preferably conducted at a temperature of 440-500° C. for several tens of seconds to several minutes (for example, 30 seconds to 3 minutes). The nitrided layer can be formed not only by gas nitriding, but also by salt-bath nitriding or plasma nitriding. To avoid the formation of a compound layer on the outermost surface, the plasma nitriding is preferable.

Example 1 (E1)

Steel having a composition comprising by mass 0.51% of C, 0.29% of Si, 0.72% of Mn, 0.92% of Cr, and 0.19% of V, the balance being Fe and inevitable impurities, was produced by melting in a 10-kg vacuum induction furnace. The steel was hot-rolled to form a rod having a diameter of 10 mm, and then drawn to form a wire having a rectangular cross section of 2.3 mm in thickness and 1.0 mm in width. Annealing was conducted at 700° C. for 60 minutes during the drawing step. Oil tempering was conducted by oil quenching from heating at 930° C. for 45 seconds to 60° C., and tempering at 470° C. for 60 seconds. The above wire was formed into a compression ring having a nominal diameter of 73 mm, which was subjected to a strain-removing heat treatment at 450° C. for 60 minutes, and provided with an ion-plated CrN coating on the outer peripheral surface, and a gas-nitrided layer on the side and inner peripheral surfaces. The nitriding conditions were 500° C. and 180 minutes. The hardness of a base material before nitriding was measured in advance.

[1] Measurement of Thermal Conductivity

Thermal conductivity was measured 3 times by a laser flash method on samples as thick as 1 mm, which were cut out of a rod having a diameter of 5 mm, which was made of the steel of Example 1, and polished. The average thermal conductivity obtained from three measured data was 38 W/(mK).

[2] Measurement of Hardness of Nitrided Layer

The compression ring of Example 1 was cut, and its cross section was mirror-polished. The micro-Vickers hardness (HV0.05) of the nitrided layer on the side surface was measured at every depth of 20 μm in a range of 20 μm to 120 μm from the surface. The hardness values were 802 HV0.05 at a position of 20 μm, 780 HV0.05 at a position of 40 μm, 766 HV0.05 at a position of 60 μm, 701 HV0.05 at a position of 80 μm, 671 HV0.05 at a position of 100 μm, and 565 HV0.05 at a position of 120 μm. It was calculated from these data that the hardness reduction ratio was 0.9 HV0.05/μm between 20 μm and 60 μm, 2.0 HV0.05/μm between 40 μm and 80 μm, and 2.4 HV0.05/μm between 60 μm and 100 μm, indicating that even after removing a portion as thick as about 30 μm including the compound layer, the hardness reduction ratio of 2.0 HV0.05/μm or less was secured. The base material had hardness of 435 HV1, 92.8% of the hardness of 469 HV1 before nitriding.

Examples 2-4 (E2-E4), and Comparative Example 1 (C1)

Each wire was produced in the same manner as in Example 1 except for using steel having the composition shown in Table 1, and formed into a compression ring, which was provided with a CrN coating on the outer peripheral surface, and a nitrided layer on the side and inner peripheral surfaces. The thermal conductivity of each compression ring, and the hardness of each nitrided layer and each base material were measured. The results are shown in Tables 1 to 3 together with those of Example 1.

TABLE 1

| No. | Composition (% by mass)* | | | | | | | | Thermal Conductivity W/(mK) |
| | C | Si | Mn | Cr | Mo | V | B | Total | |
| --- | --- | --- | --- | --- | --- | --- | --- | --- | --- |
| E1 | 0.51 | 0.29 | 0.72 | 0.92 | — | 0.19 | — | 2.63 | 38 |
| E2 | 0.59 | 0.21 | 0.69 | 1.01 | 0.28 | — | — | 2.78 | 35 |
| E3 | 0.48 | 0.19 | 0.92 | 0.88 | — | — | 0.0005 | 2.47 | 39 |
| E4 | 0.46 | 0.24 | 0.81 | 0.71 | 0.22 | 0.14 | — | 2.58 | 38 |
| C1 | 0.55 | 1.44 | 0.68 | 0.71 | — | — | — | 3.38 | 31 |

*P and S were contained as inevitable impurities, though not listed in the table above.

TABLE 2

| | Hardness of Nitrided Layer, HV 0.05 | | | | | | Hardness Reduction Ratio HV 0.05/μm | | | |
| | (depth from surface, μm) | | | | | | 20-60 | 40-80 | 60-100 | 80-120 |
| No. | 20 | 40 | 60 | 80 | 100 | 120 | μm | μm | μm | μm |
| --- | --- | --- | --- | --- | --- | --- | --- | --- | --- | --- |
| E1 | 802 | 780 | 766 | 701 | 671 | 565 | 0.9 | 2.0 | 2.4 | 3.4 |
| E2 | 885 | 860 | 847 | 791 | 736 | 670 | 1.0 | 1.7 | 2.8 | 3.0 |
| E3 | 756 | 745 | 732 | 680 | 655 | 608 | 0.6 | 1.6 | 1.9 | 1.8 |

TABLE 2-continued

| | Hardness of Nitrided Layer, HV 0.05 (depth from surface, µm) | | | | | | Hardness Reduction Ratio HV 0.05/gm | | | |
|---|---|---|---|---|---|---|---|---|---|---|
| No. | 20 | 40 | 60 | 80 | 100 | 120 | 20-60 µm | 40-80 µm | 60-100 µm | 80-120 µm |
| E4 | 794 | 787 | 759 | 683 | 612 | 536 | 0.9 | 2.6 | 3.7 | 3.7 |
| C1 | 726 | 670 | 570 | 512 | 494 | 469 | 3.9 | 4.0 | 1.9 | 1.1 |

TABLE 3

| | Hardness of Base Material, HV1 | | |
|---|---|---|---|
| No. | Before Nitriding | After Nitriding | Ratio[1] (%) |
| E1 | 469 | 435 | 92.8 |
| E2 | 488 | 461 | 94.5 |
| E3 | 444 | 402 | 90.5 |
| E4 | 456 | 427 | 93.6 |
| C1 | 494 | 423 | 85.6 |

Note:
[1]The ratio of hardness after nitriding to hardness before nitriding.

FIG. 1 shows the hardness of each nitrogen diffusion layer shown in Table 2, which is plotted against the depth from the nitrided surface. The hardness values were 700 HV0.05 or more up to the depth of 110 µm in Example 2 (E2), and 700 HV0.05 or more to the depth of 70 µm in Example 4 (E4). It is thus clear that even after removing a portion as thick as about 30 µm including the compound layer, the hardness is 700 HV0.05 or more to the depth of 40 µm from the outermost surface, with an extremely small hardness reduction ratio in a depth direction. In Examples 1-4 (E1-E4), the hardness reduction ratios in a depth direction were 3 HV0.05/µm or less in a region having hardness of 700 HV0.05 or more. In Comparative Example 1 (C1), however, the diffusion layer having of 700 HV0.05 or more was to the depth of 30 µm, indicating that nitriding should be conducted for a considerably long period of time to have, for example, of 700 HV0.05 or more to the depth of 70 µm, making a nitrided piston ring unpractical.

As shown in Table 3, the base materials kept hardness of 90.5-94.5% relative to those before nitriding, despite decrease by nitriding. In Examples 1, 2 and 4 (E1, E2 and E4) containing Mo and/or V, the base materials had relatively high hardness before and after nitriding, with a ratio (after nitriding/before nitriding) of 92% or more. In Comparative Example 1 (C1), however, the hardness largely decreased by nitriding, with a ratio (after nitriding/before nitriding) of 85.6%.

Figure 2:
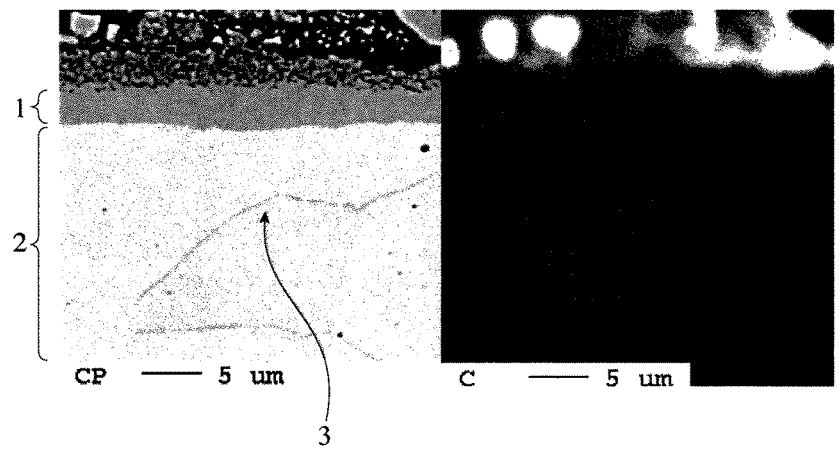
FIG. 2 is a photograph showing a cross section of the nitrided layer of Example 1, in which C is concentrated in grain boundaries.

In the cross section in Example 1, FIG. 2 shows its structure observed by a microscope (on the left photograph), and the area analysis result of C (on the right photograph) by an electron probe micro analyzer (EPMA). It is clear that C is concentrated in grain boundaries in the diffusion layer.

Examples 5 and 6 (E5 and E6), and Comparative Example 2 (C2)

Compression rings were produced in the same manner as in Example 1, except for conducting nitriding under the conditions shown in Table 4. As in Example 1, the hardness of each nitrided layer and each base material was measured. The results are shown in Tables 5 and 6.

TABLE 4

| | Nitriding Conditions | |
|---|---|---|
| No. | Temperature (° C.) | Time (minute) |
| E5 | 470 | 180 |
| E6 | 440 | 300 |
| C2 | 510 | 180 |

TABLE 5

| | Hardness of Nitrided Layer, HV 0.05 (depth from surface, µm) | | | | | | Hardness Reduction Ratio HV 0.05/µm | | | |
|---|---|---|---|---|---|---|---|---|---|---|
| No. | 20 µm | 40 µm | 60 µm | 80 µm | 100 µm | 120 µm | 20-60 µm | 40-80 µm | 60-100 µm | 80-120 µm |
| E5 | 802 | 745 | 693 | 623 | 533 | 459 | 2.7 | 3.1 | 4.0 | 4.1 |
| E6 | 773 | 732 | 660 | 599 | 512 | 501 | 2.8 | 3.3 | 3.7 | 2.5 |
| C2 | 811 | 782 | 762 | 728 | 673 | 564 | 1.2 | 1.4 | 2.2 | 4.1 |

TABLE 6

| | Hardness of Base Material, HV1 | | |
|---|---|---|---|
| No. | Before Nitriding | After Nitriding | Ratio[1] (%) |
| E5 | 469 | 435 | 92.8 |
| E6 | 455 | 433 | 95.2 |
| C2 | 465 | 414 | 89.0 |

Note:
[1]The ratio of hardness after nitriding to hardness before nitriding.

As is clear from Table 6, when the nitriding temperature exceeded +30° C. over the tempering temperature (Comparative Example 2, C2), the hardness of the base material decreased by nitriding to less than 90% of that before nitriding, and when the nitriding temperature was equal to the tempering temperature (Example 5, E5) or lower than it (Example 6, E6), the hardness of the base material did not decrease through nitriding to less than 92% or 94%. With respect to the nitriding depth, as is clear from Table 5, a diffusion layer having hardness of 700 HV0.05 or more was obtained to sufficient depth (up to about 50 µm), by slightly elongating the nitriding time even at a low nitriding temperature.

What is claimed is:
1. A piston ring made of steel comprising C, Si, Mn and Cr as indispensable alloy elements, and Mo, V and B as optional alloy elements;
   said indispensable alloy elements having a composition comprising by mass 0.45-0.65% of C, 0.15-0.35% of Si, 0.65-1.00% of Mn, and 0.60-1.10% of Cr;
   said optional alloy elements having a composition comprising by mass less than 0.35% of Mo, less than 0.25% of V, and less than 0.001% of B;
   the total amount of said indispensable alloy elements and said optional alloy elements being less than 3.0% by mass; and
   a nitrided layer being formed on the surface;
   wherein the outermost surface of said nitride layer is a diffusion layer exposed by removing a compound layer;
   wherein said diffusion layer has hardness of 700-900 HV0.05 to the depth of 40 µm from said outermost surface and a hardness reduction ratio of 3 HV0.05/µm or less in a depth direction to the depth of 40 µm from said outermost surface; and wherein said steel contains C concentrated in prior austenite grain boundaries.

2. The piston ring according to claim 1, whose base material has hardness, which is 90-100% of the hardness before nitriding.

3. The piston ring according to claim 1, wherein prior austenite grains in said steel have a grain size number of 8 or more.

4. The piston ring according to claim 1, wherein said steel has a structure in which spheroidal cementite is dispersed in a tempered martensite matrix.

5. The piston ring according to claim 1, which is a compression ring having said nitrided layer formed on side surfaces of the piston ring.

6. A method for producing the piston ring recited in claim 1 from a wire made of steel comprising C, Si, Mn and Cr as indispensable alloy elements, and Mo, V and B as optional alloy elements; said indispensable alloy elements having a composition comprising by mass 0.45-0.65% of C, 0.15-0.35% of Si, 0.65-1.00% of Mn, and 0.60-1.10% of Cr; said optional alloy elements having a composition comprising by mass less than 0.35% of Mo, less than 0.25% of V, and less than 0.001% of B; and the total amount of said indispensable alloy elements and said optional alloy elements being less than 3.0% by mass; comprising conducting oil tempering at a quenching temperature of 820-930° C. and a tempering temperature of 440-500° C. before forming said piston ring; and conducting a strain-removing heat treatment at a temperature of 420-480° C., lower than said tempering temperature, and nitriding at a temperature within ±30° C. from said tempering temperature, after forming the piston ring.

7. The method for producing a piston ring according to claim 6, wherein annealing is conducted before said oil tempering.

* * * * *